(12) United States Patent
Oishi et al.

(10) Patent No.: US 11,305,432 B2
(45) Date of Patent: Apr. 19, 2022

(54) WORK MACHINE AND PICK-UP POSITION SELECTION METHOD

(71) Applicant: FUJI CORPORATION, Chiryu (JP)

(72) Inventors: Nobuo Oishi, Kosai (JP); Kazuaki Mori, Anjo (JP)

(73) Assignee: FUJI CORPORATION, Chiryu (JP)

(*) Notice: Subject to any disclaimer, the term of this patent is extended or adjusted under 35 U.S.C. 154(b) by 374 days.

(21) Appl. No.: 16/472,308

(22) PCT Filed: Jan. 12, 2017

(86) PCT No.: PCT/JP2017/000765
§ 371 (c)(1),
(2) Date: Jun. 21, 2019

(87) PCT Pub. No.: WO2018/131108
PCT Pub. Date: Jul. 19, 2018

(65) Prior Publication Data
US 2019/0375110 A1    Dec. 12, 2019

(51) Int. Cl.
*G05B 15/00* (2006.01)
*G05B 19/00* (2006.01)
(Continued)

(52) U.S. Cl.
CPC ........... *B25J 9/1697* (2013.01); *B25J 13/088* (2013.01); *G06T 7/70* (2017.01);
(Continued)

(58) Field of Classification Search
CPC ...... B25J 13/088; B25J 9/1679; B25J 9/1697; G06T 2207/30164; G06T 7/70; G05B 2219/40053; G05B 2219/45063
See application file for complete search history.

(56) References Cited

U.S. PATENT DOCUMENTS

| 7,313,464 B1* | 12/2007 | Perreault | B25J 9/1666 |
| | | | 318/568.1 |
| 2010/0004778 A1* | 1/2010 | Arimatsu | B25J 9/1697 |
| | | | 700/214 |

(Continued)

FOREIGN PATENT DOCUMENTS

| JP | 7-108482 A | 4/1995 |
| JP | 2015-145055 A | 8/2015 |

OTHER PUBLICATIONS

International Search Report dated Apr. 4, 2017 in PCT/JP2017/000765 filed on Jan. 12, 2017.

*Primary Examiner* — Harry Y Oh
(74) *Attorney, Agent, or Firm* — Oblon, McClelland, Maier & Neustadt, L.L.P.

(57) ABSTRACT

A work machine includes a pickup member configured to pick up a component; a storage device configured to store positional information on multiple pickup positions where the pickup member can pick up the component; a recognition device configured to optically recognize a multiple of the component including the pickup target; and a control device configured to select, from the multiple pickup positions of the pickup target component, one pickup position which is less likely to interfere with other components based on the positional information and a recognition result from the recognition device, and cause the pick member to pick up the pickup target component at the one selected pickup position.

6 Claims, 7 Drawing Sheets

(51) Int. Cl.
    *B25J 9/16*           (2006.01)
    *G06T 7/70*          (2017.01)
    *B25J 13/08*        (2006.01)

(52) U.S. Cl.
    CPC .............. *G05B 2219/40053* (2013.01); *G05B 2219/45063* (2013.01); *G06T 2207/30164* (2013.01)

(56) References Cited

U.S. PATENT DOCUMENTS

| | | | |
|---|---|---|---|
| 2011/0222995 A1 | 9/2011 | Irie et al. | |
| 2011/0223000 A1* | 9/2011 | Martinez | B25J 13/085 414/730 |
| 2011/0251717 A1 | 10/2011 | Furukawa | |
| 2013/0166061 A1* | 6/2013 | Yamamoto | B25J 9/1697 700/214 |
| 2014/0121836 A1* | 5/2014 | Ban | B25J 9/0093 700/259 |
| 2015/0073589 A1* | 3/2015 | Khodl | B65G 1/1378 700/218 |
| 2015/0127162 A1* | 5/2015 | Gotou | B25J 9/1671 700/259 |
| 2016/0167228 A1* | 6/2016 | Wellman | B25J 9/1697 700/218 |

* cited by examiner

WORK MACHINE AND PICK-UP POSITION SELECTION METHOD

TECHNICAL FIELD

The present description discloses a work machine and a pick-up position selection method.

BACKGROUND ART

Conventionally, there have been proposed work machines in which one component is picked up from multiple components (target objects) that are supplied with their directions or orientations aligned unevenly (for example, refer to Patent Literature 1). In such a work machine, supplied multiple components are imaged by a camera, a component in a specific orientation is selected by processing the image captured by the camera, and the selected component is picked up through suction by a suction nozzle so that the picked up component is realigned to a predetermined orientation.

PATENT LITERATURE

Patent Literature 1: JP-A-7-108482

BRIEF SUMMARY

Technical Problem

In the work machine described above, components are sometimes found overlapping or the like such that, when attempting to pick up a component, the component is situated in a position where at least one other component interferes with the component to be picked up. In this case, it becomes difficult for the work machine to properly pick up the selected component, resulting in a reduction in pickup efficiency from time to time.

A primary object of the work machine and the pickup position selection method of this disclosure is to pick up properly and efficiently a component situated in a position where at least one other component interferes with the component to be picked up.

Solution to Problem

The work machine and the pickup position selection method of the present disclosure achieve the primary object described above by adopting the following means.

According to the disclosure, the work machine includes: a pickup member configured to pick up a component; a storage device configured to store positional information on multiple pickup positions where the pickup member can pick up the component; a recognition device configured to optically recognize a multiple of the component including the pickup target; and a control device configured to select, from the multiple pickup positions of the pickup target component, one pickup position which is less likely to interfere with other components based on the positional information and a recognition result from the recognition device, and cause the pick member to pick up the pickup target component at the one selected pickup position.

In the work machine of the disclosure, the control device selects, from the multiple pickup positions of the pickup target component, one pickup position which is less likely to interfere with other components based on the positional information and recognition result from the recognition device, and controls the pickup member to pick up the pickup target component at the one selected pickup position. Due to this, even in the case where when attempting to pick up a component, another component is situated close to the component to be picked up, one pickup position where the component to be picked up is less likely to interfere with the other component is selected from the multiple pickup positions to thereby pick up properly the component to be picked up. In addition, since only one pickup position is selected from the multiple pickup positions, the process of selecting the pickup position can be executed with good efficiency.

According to the disclosure, a pickup position selection method is provided, including steps of (a) acquiring positional information on multiple pickup positions where a pickup member can pick up a component, (b) optically recognizing a multiple of the component including the pickup target, and (c) selecting one pickup position from the multiple pickup positions of a pickup target component to be picked up based on positional information acquired in step (a) and a recognition result recognized in step (b), the one selected pickup position being a position where the pickup target component to be picked up is less likely to interfere with another component of the multiple components.

The pickup position selection method according to the disclosure acquires the positional information on the multiple pickup positions where the pickup member can pickup the component, the multiple components including the pickup target are optically recognized, and the one pickup position, where the pickup target component to be picked up is less likely to interfere with another component of the multiple components, is selected from the multiple pickup positions based on the acquired positional information and the recognized recognition result. Due to this, even in the case where when attempting to pick up a component, another component is situated close to the component to be picked up, one pickup position where the component to be picked up is less likely to interfere with the other component is selected from the multiple pickup positions. In addition, since only one pickup position is selected from the multiple pickup positions, the process of selecting the pickup position can be executed with good efficiency.

DESCRIPTION OF EMBODIMENT

Next, a mode for carrying out the present disclosure will be described.

Figure 1:
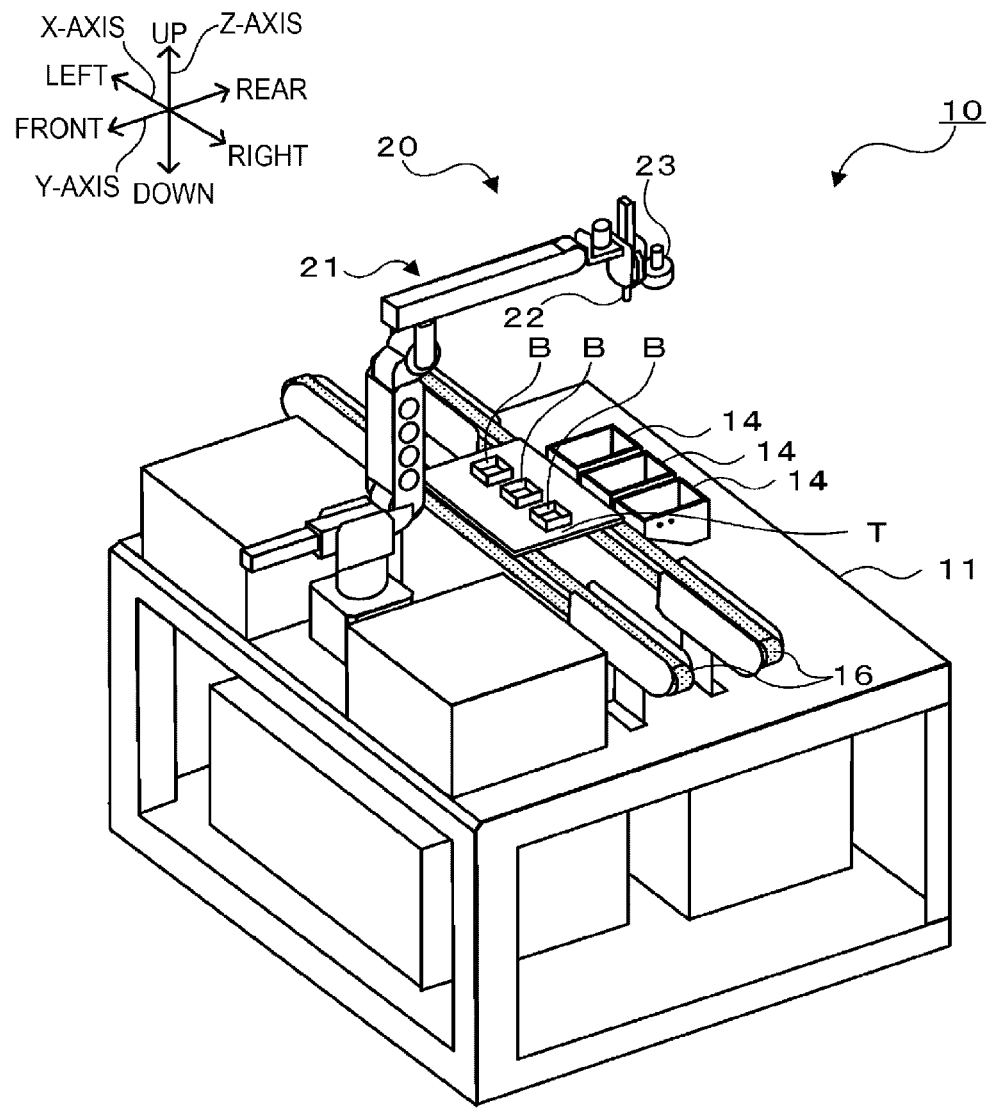
FIG. 1 A diagram illustrating the configuration of work transfer system 10.
Figure 2:
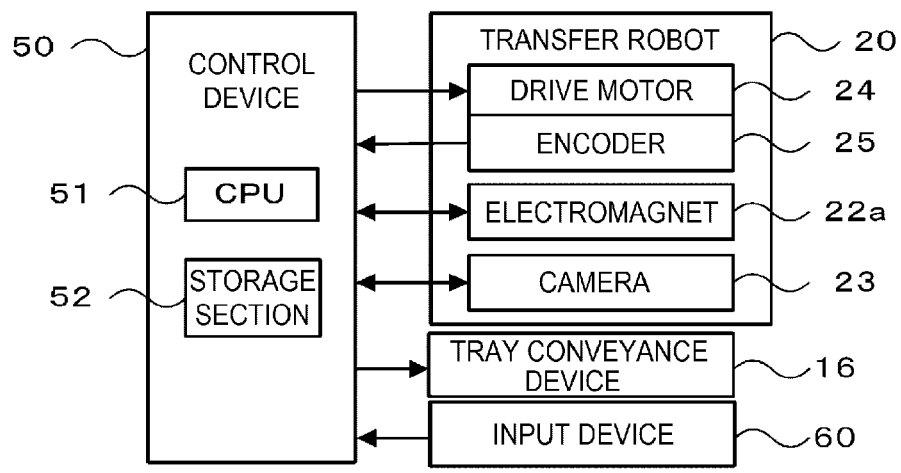
FIG. 2 A diagram illustrating the electrical connections of control device 50.

FIG. 1 is a diagram illustrating the configuration of work transfer system 10. FIG. 2 is a diagram illustrating the electrical connections of control device 50. Hereinafter, in work transfer system 10, a left-right direction (X axis), a front-rear direction (Y axis), and an up-down direction (Z axis) will be described based on directional indicators illustrated in FIG. 1.

work transfer system 10 of this embodiment constitutes a system in which workpieces (components) such as washers and bolts in supply boxes 14 are picked up to be installed in installation boxes B on tray T or placed on tray T. work transfer system 10 includes, as shown in FIGS. 1, 2, multiple (for example, three) supply boxes 14, tray conveyance device 16, transfer robot 20, and control device 50. Workpieces are supplied into supply boxes 14 by a supply robot or a supply conveyor, not shown, or an operator. Workpieces within supply boxes 14 are aligned unevenly in relation to position, direction, or orientation, and hence, some workpieces overlap one another. Tray conveyance device 16 conveys tray T in a left-right direction by driving a pair of front and rear conveyor belts. Tray conveyance device 16 and transfer robot 20 are set on work bench 11. Installation boxes B on tray T are boxes opened upwards, and multiple (for example, three) installation boxes B are disposed on tray T. Installation boxes B are sized to match, for example, a washer to be installed therein, and multiple washers can be installed in a superposed fashion in each of installation boxes B.

Transfer robot 20 is a robot configured to pick up workpieces in supply boxes 14 to place or mount the workpieces on tray T (including installation boxes B). Transfer robot 20 includes, as illustrated in FIG. 1, vertical articulated robot arm 21 and end effector 22. Robot arm 21 includes multiple links, multiple joints configured to couple the links together rotatably, multiple drive motors 24 (refer to FIG. 2) configured to drive the joints, and multiple encoders 25 (refer to FIG. 2) configured to individually detect angles of the joints. One each of drive motor 24 and encoder 25 are shown in FIG. 2. End effector 22 can hold and release a workpiece using, for example, a mechanical chuck, a suction nozzle, or an electromagnet. In this embodiment, metallic washer Wa (refer to FIG. 4) is described as constituting an example of a workpiece, and cylindrical electromagnet 22a (refer to FIG. 6) is described as constituting an example of end effector 22. Camera 23 is also attached to a tip link of robot arm 21 to image workpieces or the like in supply box 14 disposed therebelow to recognize positions and conditions of the workpieces.

Control device 50 is, as illustrated in FIG. 2, configured as a microprocessor made up mainly of CPU 51 and includes storage section 52, such as ROM or HDD, in addition to CPU 51. Various signals are inputted into control device 50 from encoders 25 and camera 23 of pickup robot 20, input device 60, and the like. Various control signals are outputted to drive motors 24, electromagnets 22a, and camera 23 of pickup robot 20, tray conveyance device 16, and the like from control device 50. The operator can input operation commands for work transfer system 10, types of workpieces installed in supply boxes 14, and the like through input device 60.

Figure 3:
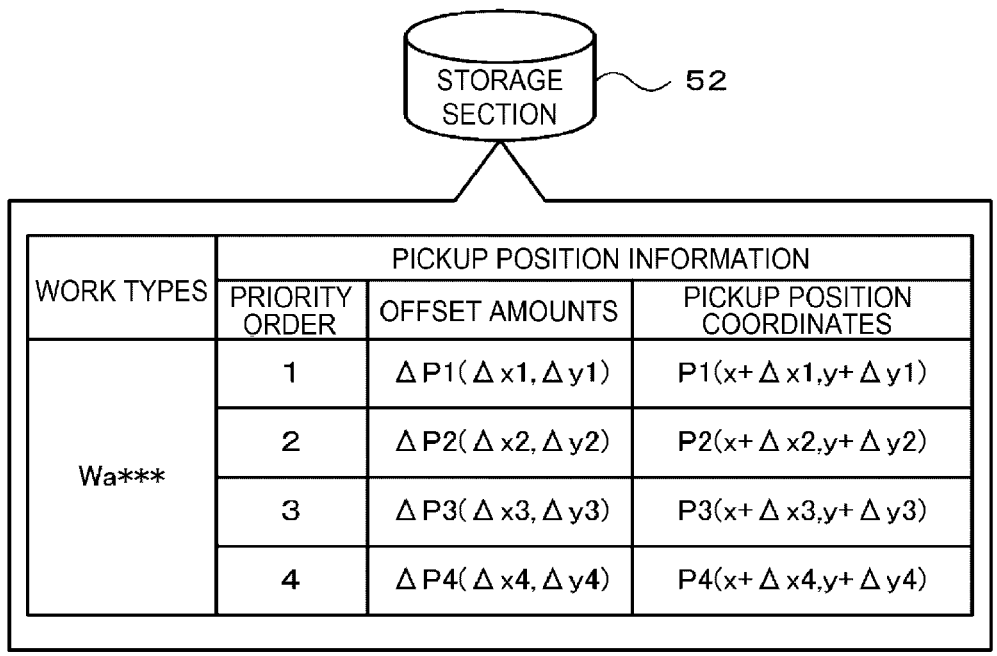
FIG. 3 A diagram illustrating an example of information on pickup positions that is stored in storage section 52.
Figure 4:
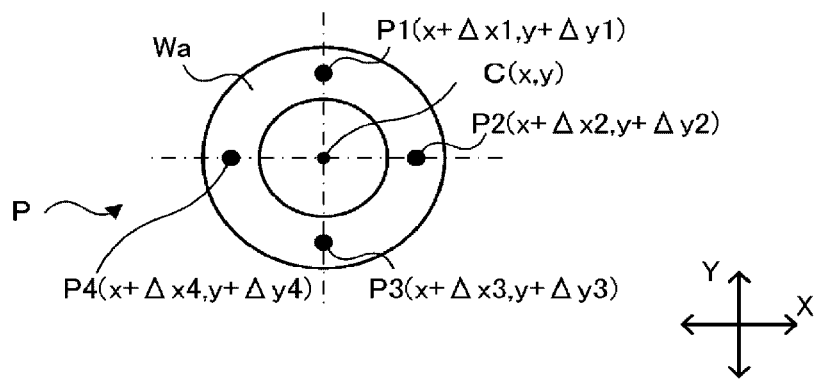
FIG. 4 A diagram illustrating an example of pickup position P of washer Wa.

Storage section 52 of control device 50 stores information on pickup positions P for use in picking up a workpiece. FIG. 3 is a diagram illustrating one example of pickup position information stored in storage section 52, and FIG. 4 is a diagram illustrating one example of pickup position P of washer Wa. Pickup position information is information that associates priority order, offset amounts, and pickup position coordinates with one another. Here, although transfer robot 20 can pick up washer Wa in supply box 14 by attracting the washer Wa in any position thereon using electromagnet 22a, in this embodiment, any one of multiple predetermined pickup positions P is selected so that washer Wa is picked up at selected pickup position P. As pickup positions P, for example, as illustrated in FIG. 4, four pickup positions P1 to P4 are predetermined which are 90 degrees apart in a circumferential direction in a top view of washer Wa, and storage section 52 stores offset amounts ΔP1 to ΔP4 of pickup positions P1 to P4 based on center C(x, y) of washer Wa and pickup position coordinates based on center C(x, y) and offset amounts ΔP1 to ΔP4. Pickup positions P1 to P4 are stored in association with a priority order in which pickup positions P1 to P4 are prioritized in a descending order from P1 to P4. In this embodiment, offset amount ΔP specifies a difference in X coordinate value and a difference in Y coordinate value from center C (x, y) as a reference. In this way, offset amount ΔP reflects deviation amounts and deviation directions of individual pickup positions P1, P2, P3, P4 from center C(x, y) and may directly specify deviation amounts (distances) and deviation directions (angles) from center C(x, y) as a reference position.

Figure 5:
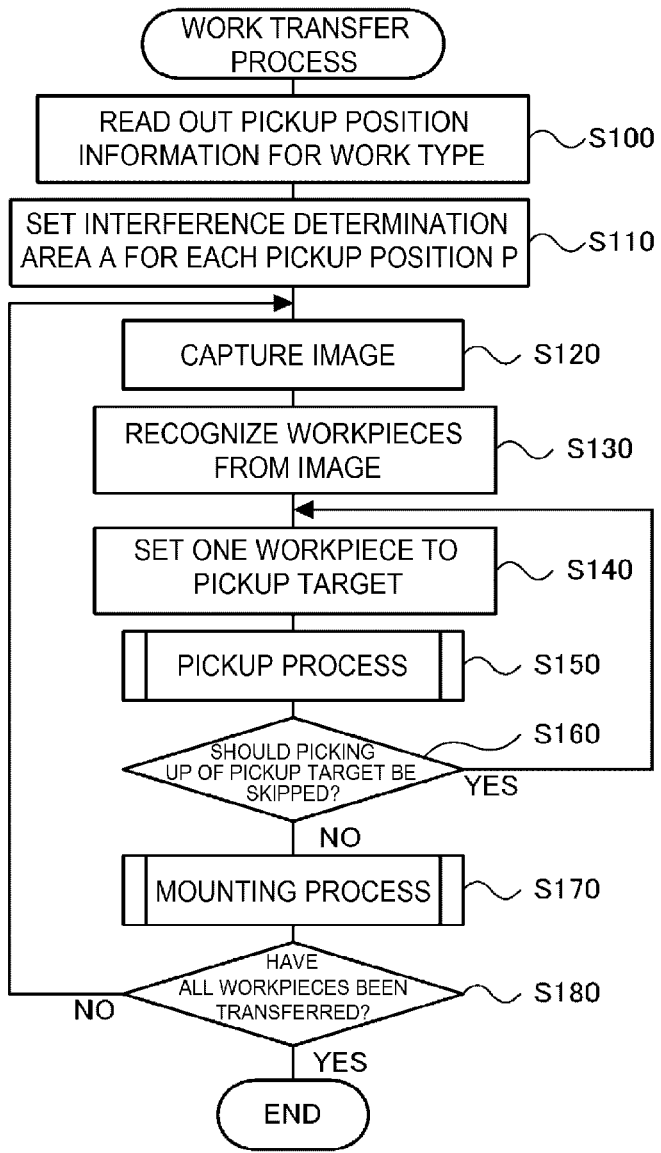
FIG. 5 A flow chart illustrating an example of a work transfer process.

Next, the operation of work transfer system 10 of this embodiment configured in the way described above will be described. FIG. 5 is a flow chart illustrating one example of a work transfer process. This routine is executed by CPU 51 of control device 50. When a work transfer process starts, CPU 51 of control device 50 firstly reads out pickup position information on a type of workpiece (washer Wa) that constitutes a processing target of this time from storage section 52 (S100) and sets interference determination areas A for individual pickup positions P (S110).

Figure 6:
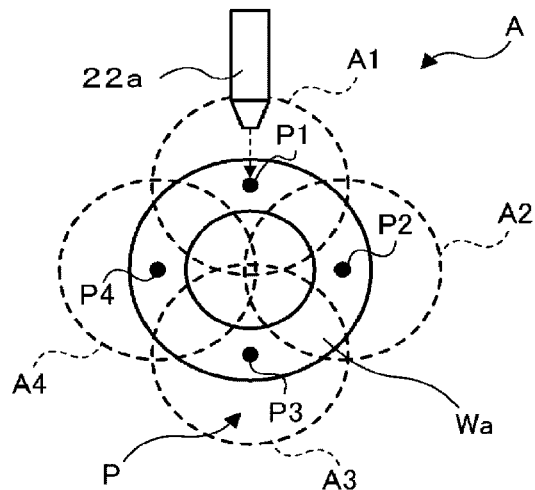
FIG. 6 A diagram illustrating an example of interference determination area A for each pickup position P.

Here, FIG. 6 is a diagram illustrating one example of interference determination areas A for individual pickup position P. Here, interference determination areas A are areas for determining the magnitude of interference of a pickup target workpiece (washer Wa) with other workpieces at pickup positions P when attempting to pick up the pickup target workpiece. As illustrated in FIG. 6, when picking up washer Wa using electromagnet 22a, interference determination areas A are specifically determined as areas around pickup positions P that are affected by a magnetic force of electromagnet 22a. Individual interference determination areas A1 to A4 are formed as circular areas defined around corresponding pickup positions P1 to P4. For example, interference determination area A1 is an area that is affected by the magnetic force of electromagnet 22a when picking up washer Wa at pickup position P1 using electromagnet 22a. In the case where other washers Wa strongly interfere with interference area A, when transfer robot 20 attempts to pick up washer Wa at pickup position P1, there may be a risk of transfer robot 20 attracting other washers Wa with its magnetic force resulting in picking up other washers at the same time. In this case, it becomes difficult for transfer robot 20 to properly install picked up washer inside installation box B. In other words, as long as pickup position P is such that other washers Wa do not interfere or interfere marginally with interference determination areas A, transfer robot 20 can properly pick up pickup target washer Wa in that pickup position P and properly install it in installation box B. In addition, interference determination areas A are areas that expand or contract in accordance with the magnetic force of electromagnet 22a. Due to this, in S110, CPU 51 sets interference determination areas A based on the magnitude of electric current that is applied to electromagnet 22a in attracting the processing target workpiece (washer Wa) of this time. Interference determination areas A may be determined in advance for each type of workpiece, based on the magnitude of electric current applied to electromagnet 22a, and stored in storage section 52. In this case, CPU 51 need only read out information on interference determination areas A from storage section 52 in S110.

Next, CPU 51 images the interior of supply box 14 that installs the transfer processing target workpiece (washer Wa) (S120) and recognizes multiple workpieces (washers Wa) from the image captured by CPU 51 (S130). In S130, CPU 51 recognizes workpieces by extracting areas that match the workpieces (washers Wa) in color (a pixel value) and shape from the captured image. In addition, CPU 51 can also recognize whether the workpieces (washers Wa) reside alone or are adjacent to or overlapping one another from the sizes and shapes of the extracted areas. Next, CPU 51 sets one workpiece (washer Wa) among the multiple workpieces (washers Wa) recognized from the captured image to a pickup target for this time (S140). Subsequently, CPU 51 executes a pickup process where transfer robot 20 picks up the pickup target workpiece (S150) and determines whether picking up of the pickup target workpiece is skipped in the pickup process (S160). If CPU 51 determines that picking up of the pickup target workpiece is not skipped, CPU 51 executes a mounting process (S170) of mounting the workpiece, picked up in the pickup process, in installation box B on tray T. On the other hand, if CPU 51 determines that picking up of the pickup target workpiece is skipped, CPU 51 returns to S140 to repeat the process therein. Then, CPU 51 determines whether the transfer process of all the workpieces is completed (S180), and if CPU 51 determines that the transfer process of all the workpieces is not complete, CPU 51 returns to S120 to repeat the process therein, whereas if all the workpieces have already been transferred, CPU 51 ends the process. In the case where a workpiece to be mounted such as the workpiece that is skipped from picking up in the pickup process in S160 still remains in supply box 14, CPU 51 may return to S120 to repeat the process therein after causing a vibration device, not shown, to provide a vibration to supply box 14 so as to shake supply box 14. There may be a case where workpieces are newly supplied into supply box 14 in the midst of the work transfer process, in which case CPU 51 also returns to S120 to repeat the process therein. Hereinafter, the pickup process in S150 and the mounting process in S170 will be described.

Figure 7:
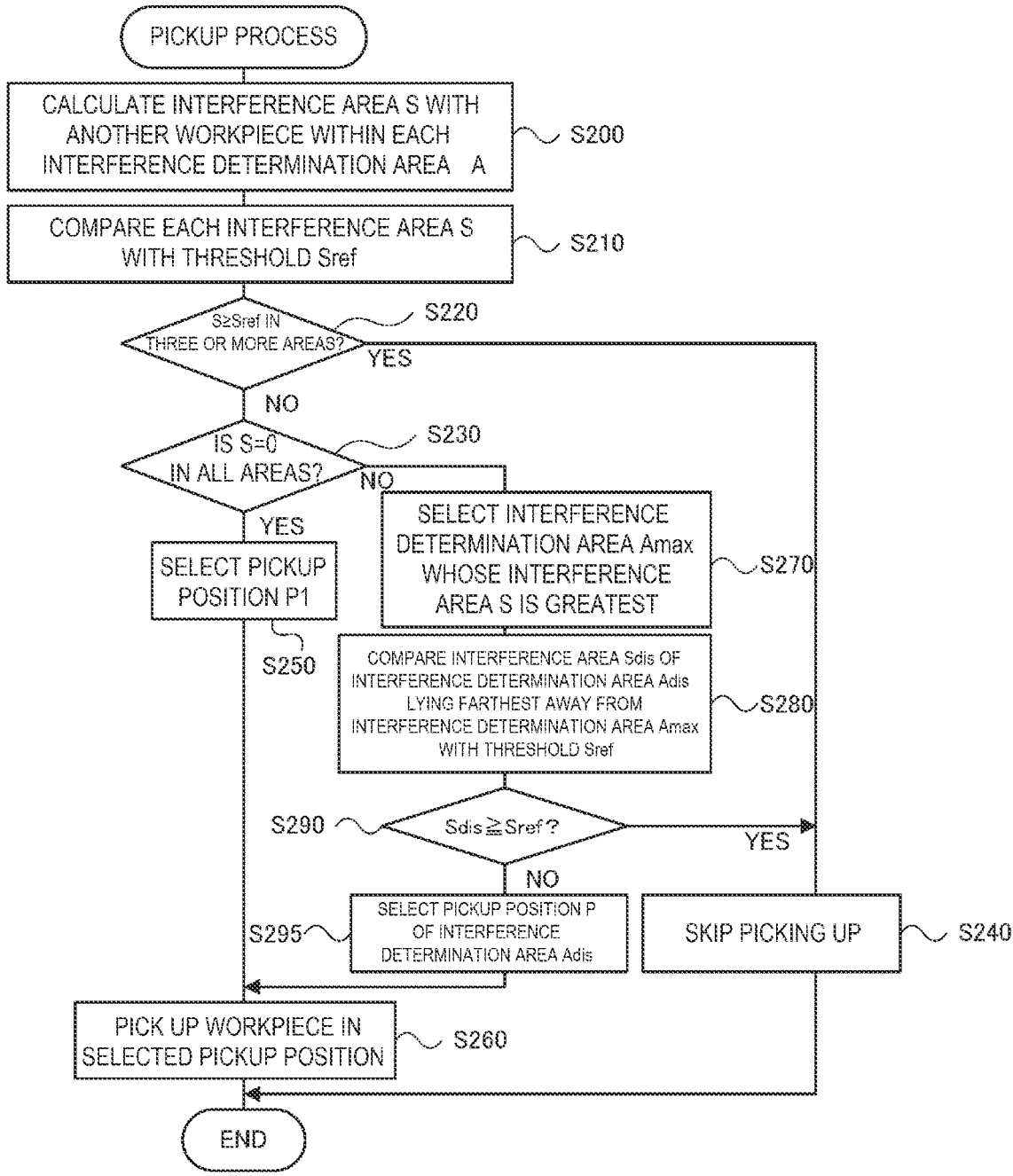
FIG. 7 A flow chart illustrating an example of a pickup process.

FIG. 7 is a flow chart illustrating one example of a pickup process. In the pickup process, CPU 51 first sets center C of an area of a pickup target workpiece (washer Wa) and calculates interference areas S where the pickup target workpiece (washer Wa) interferes with other workpieces in interference determination areas A (A1 to A4) of pickup positions P (P1 to P4) based on the center C so set (S200). Next, CPU 51 compares interference area S of each interference determination area A with threshold Sref (S210) and determines whether interference area S is threshold Sref or larger in three or more interference determination areas A (S220) and whether interference area S takes a value of 0 in all interference determination areas (S230). Here, threshold Sref is set at a value that enables a determination of whether areas (surface areas) over which other workpieces interfere with interference determination areas of a pickup target workpiece are to the extent that the pickup target workpiece is picked up properly only with great difficulty. If CPU 51 determines in S220 that interference area S is threshold Sref or greater in three or more interference determination areas A, CPU 51 skips picking up of the pickup target workpiece (S240) and ends the pickup process. That is, in the case where other workpieces greatly interfere with the pickup target workpiece in three or more interference determination areas A in four interference determination areas A (A1 to A4) that correspond to four pickup positions P (P1 to P4), thereby determining that it is difficult to pick up the pickup target workpiece properly, CPU 51 skips picking up of the pickup target workpiece. In addition, if CPU 51 determines in S220 that interference area S is not threshold Sref or greater in three or more interference determination areas A and determines in S230 that interference area S takes the value of 0 in all interference determination areas A. CPU 51 causes transfer robot 20 to select pickup position P1 according to the priority order (S250) and pick up the pickup target workpiece at the selected pickup position (S260) and ends the pickup process.

On the other hand, if CPU 51 makes negative determinations in S220, S230, CPU 51 selects interference determination area Amax whose interference area S is maximum or the greatest in four interference determination areas A (A1 to A4) (S270). Subsequently, CPU 51 compares interference area Sdis of interference determination area Adis that lies farthest away from greatest interference determination area Amax or, here, interference determination area Adis that lies symmetrically with interference determination area Amax with respect to or across center C with threshold Sref (S280). Then, CPU 51 determines whether interference area Sdis is threshold Serf or greater (S290). If CPU 51 determines that interference area Sdis is less than threshold Sref, CPU 51 selects pickup position P corresponding to interference determination area Adis (S295). Due to this, in the case where interference determination area Amax is interference determination area A1, if interference area Sdis of interference determination area A3, which constitutes interference determination area Adis, is less than threshold Sref, CPU 51 selects pickup position P3. Similarly, in the case where interference determination area Amax is interference determination area A2, if interference area Sdis of interference determination area A4, which constitutes interference determination area Adis, is less than threshold Sref, CPU 51 selects pickup position P4. In the case where interference determination area Amax is interference determination area A3, if interference area Sdis of interference determination area A1, which constitutes interference determination area Adis, is less than threshold Sref, CPU 51 selects pickup position P1. In the case where interference determination area Amax is interference determination area A4, if interference area Sdis of interference determination area A2, which constitutes interference determination area Adis, is less than threshold Sref, CPU 51 selects pickup position P2. Then, CPU 51 causes transfer robot 20 to pick up the pickup target workpiece at the selected pickup position (S260) and ends the pickup process. On the other hand, determining in S290 that interference area Sdis is threshold Sref or greater, CPU 51 skips picking up of the pickup target workpiece (S240) and ends the pickup process.

Figure 8:
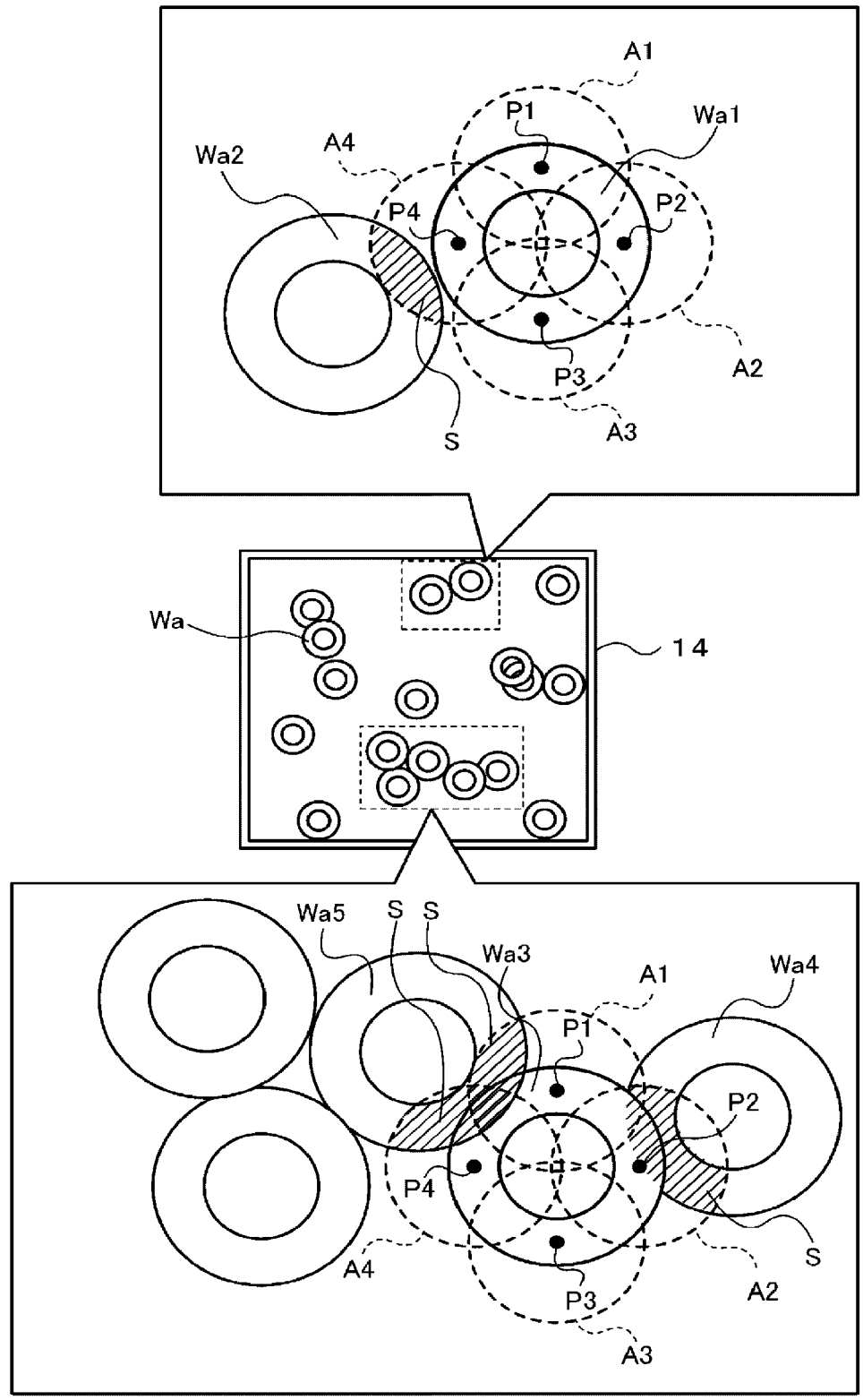
FIG. 8 A diagram illustrating a situation in which one pickup position is selected from multiple pickup positions.

Here, FIG. 8 is a diagram illustrating a situation in which one pickup position is selected from multiple pickup positions. As illustrated in FIG. 8, multiple washers Wa are inside supply box 14, and some of the multiple washers lie overlapping or adjacent to each other. In the case where washer Wa1 illustrated in an upper enlarged view constitutes a pickup target, another washer Wa2 interferes with interference determination area A4 of pickup position P4, and no other washers Wa interfere with interference determination areas A1 to A3 of other pickup positions P1 to P3. Due to this, CPU 51 selects interference determination area A4 for interference determination area Amax, and determining that interference area S of interference determination area A2 as interference determination area Adis is less than threshold Sref, CPU 51 selects pickup position P2. In the case where washer Wa3 in a lower enlarged view constitutes a pickup target, another washer Wa4 interferes with interference determination area A2 of pickup position P2, whose interference area S is threshold Sref or greater, and another washer Wa5 interferes with interference determination areas A1, A4 of pickup positions P1, P4, whose interference areas S are threshold Sref or greater. Due to this, although no other washer Wa interferes with interference determination area A3 of pickup position P3, determining that interference area S is threshold Sref or greater in three or more interference determination areas, CPU 51 skips picking up of pickup target washer Wa3.

Figure 9:
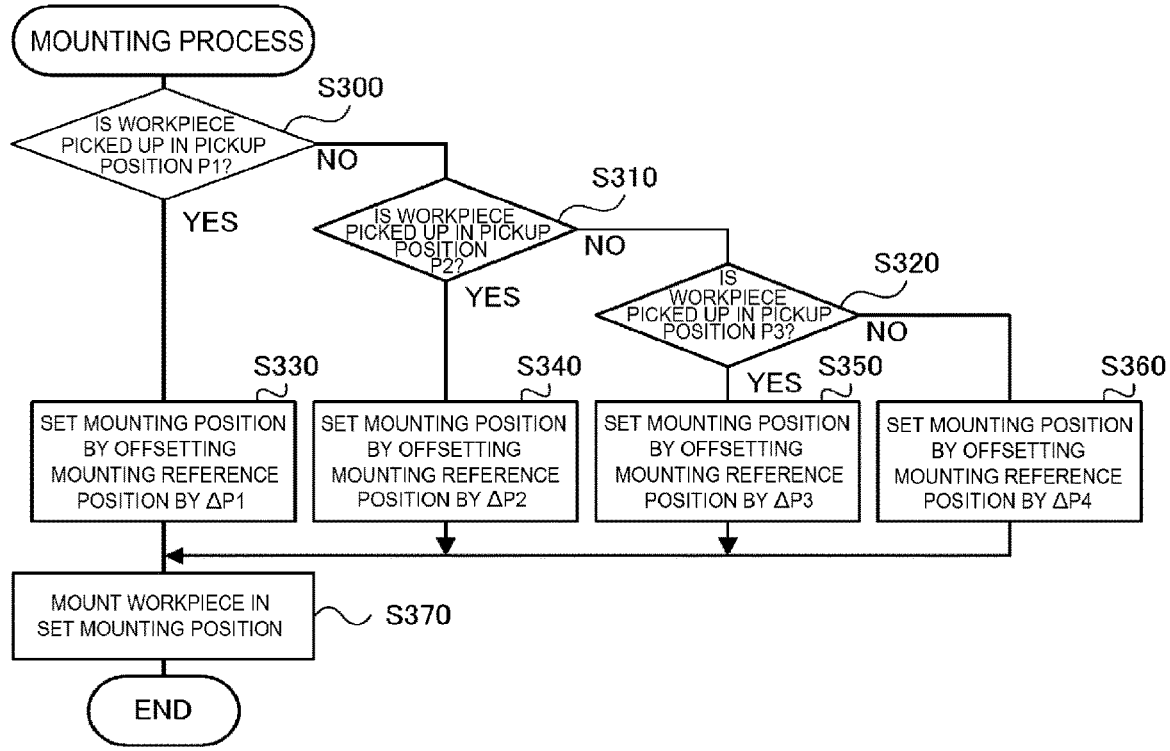
FIG. 9 A flow chart illustrating an example of a mounting process.

FIG. 9 is a flow chart illustrating one example of a mounting process. In a mounting process, CPU 51 determines whether the pickup target workpiece (water Wa) at this time is picked up at pickup position P1 (S300), whether the pickup target workpiece (washer Wa) is picked up at pickup position P2 (S310), and whether the pickup target workpiece (washer Wa) is picked up at pickup position P3 (S320). Determining in S300 that the pickup target workpiece of this time is picked up at pickup position P1, CPU 51 sets a mounting position by offsetting a mounting reference position by ΔP1 (S330). The mounting reference position is a position where center C of a workpiece is placed when the workpiece is properly installed in installation box B. Determining in S300, S310 that the pickup target workpiece at this time is picked up not at pickup position P1 but at pickup position P2, CPU 51 sets a mounting position by offsetting the mounting reference position by ΔP2 (S340). Determining in S310, S320 that the pickup target workpiece at this time is picked up not at pickup position P2 but at pickup position P3, CPU 51 sets a mounting position by offsetting the mounting reference position by ΔP3 (S350). Determining in S320 that the pickup target workpiece at this time is not picked up at pickup position P3, CPU 51 determines that the pickup target workpiece is picked up at pickup position P4 and sets a mounting position by offsetting the mounting reference position by ΔP4 (S360). Note that ΔP1 to ΔP4 are offset amounts with respect to center C as described above and are stored in the pickup positional information of storage unit 52.

Figure 10:
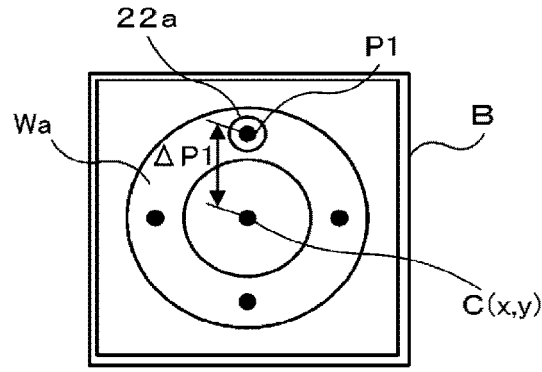
FIG. 10 A diagram illustrating a situation in which washer Wa is installed in installation box B.

Here, FIG. 10 is a diagram illustrating a situation in which washer Wa is installed in installation box B. FIG. 10 illustrates a case where CPU 51 selects pickup position P1, and transfer robot 20 installs washer Wa, that transfer robot 20 picks up at pickup position P1 using electromagnet 22a, in installation box B. As described above, in the case where washer Wa is picked up at pickup position P1, CPU 51 mounts that particular washer Wa in installation box B by offsetting the mounting position by ΔP1. As described above, in this embodiment, the workpiece can be mounted properly because CPU 51 causes transfer robot 20 to mount a workpiece in a mounting position that is offset by making use of the offset amount ΔP1 to ΔP4 of the selected pickup position P1 to P4.

Here, the corresponding relationship between the constituent elements of this embodiment and constituent elements of the disclosure will be clarified. Electromagnet 22a of this embodiment corresponds to a pickup member of the disclosure, storage section 52 of control device 50 corresponds to a storage device, camera 23 and control device 50 that executes the processes in S120, S130 of the work transfer process in FIG. 5 correspond to a recognition device, the control device 50 that executes the processes in S140 to S170 of the work transfer process (including the pickup process in FIG. 7 and the mounting process in FIG. 9) corresponds to a control device, and transfer robot 20 and control device 50 correspond to a work machine. In this embodiment, an example of a pickup position selection method of the disclosure is also clarified by describing the operations of transfer robot 20 and control device 50.

With transfer robot 20 and control device 50 that have been described heretofore, one pickup position is selected from multiple pickup positions P1 to P4 of the pickup target workpiece based on the pickup position information on multiple pickup positions P1 to P4 where the workpiece (washer Wa) can be picked up and the recognition result of the recognition by camera 23 configured to optically recognize multiple workpieces, the selected one pickup position being a position where the pickup target workpiece is less likely to interfere with the other workpieces, and the pickup target workpiece is picked up at the one selected pickup position. Due to this, even though the other workpieces lie close to the pickup target workpiece when attempting to pick up the pickup target workpiece, the pickup target workpiece can be picked up at any one of pickup positions P1 to P4. In addition, since only one pickup position is selected from multiple pickup positions P1 to P4 that are stored in advance in storage section 52, the process of selecting the pickup position can be executed efficiently.

Further, with transfer robot 20 and control device 50, since multiple pickup positions P1 to P4 are stored in storage section 52 in association with the predetermined priority order, and one pickup position is selected sequentially from pickup positions P1 to P4 in order from high priority to low priority, the pickup position can efficiently be selected.

With transfer robot 20 and control device 50, in the case where one pickup position cannot be selected from multiple pickup positions P1 to P4 of the pickup target workpiece, picking up of the pickup target workpiece is skipped, whereby a further reduction in pickup efficiency can be suppressed which would otherwise be caused by attempting to pick up a workpiece that lies close to other workpieces in all multiple pickup positions P1 to P4 thereof.

With transfer robot 20 and control device 50 since the workpiece selected in one pickup position is mounted in the mounting position that is offset in accordance with the pickup position, even when the workpiece is picked up at any one of multiple pickup positions P1 to P4, the workpiece can properly be mounted in the mounting position.

The present disclosure is in no way limited to the embodiment that has been described heretofore, and hence, the disclosure can, needless to say, be carried out in various modes without departing from the technical scope of the disclosure.

For example, although in the embodiment described above, multiple pickup positions P1 to P4 are stored in storage section 52 in association with the priority order, the configuration is not limited to this, and hence, multiple pickup positions P1 to P4 do not have to be associated with the predetermined priority order. In this case, any one of pickup positions in interference determination areas A where the pickup target workpiece interferes less with the other workpieces need only be selected.

In the embodiment described above, in the case where one pickup position cannot be selected from multiple pickup positions P1 to P4 of the pickup target workpiece, picking up of the pickup target workpiece is described as being skipped; however, the configuration is not limited to this, and hence, countermeasures other than skipping the picking up of the pickup target workpiece may be executed, which include informing of an error or vibrating supply box 14.

In the embodiment described above, pickup position P is selected which corresponds to interference determination area Adis that lies farthest away from interference determination area Amax whose interference area S is the greatest; however, the configuration is not limited to this, and hence, pickup position P may be selected which corresponds to interference determination area A with which other workpieces do not interfere and where interference area S takes the value of 0.

Figure 11:
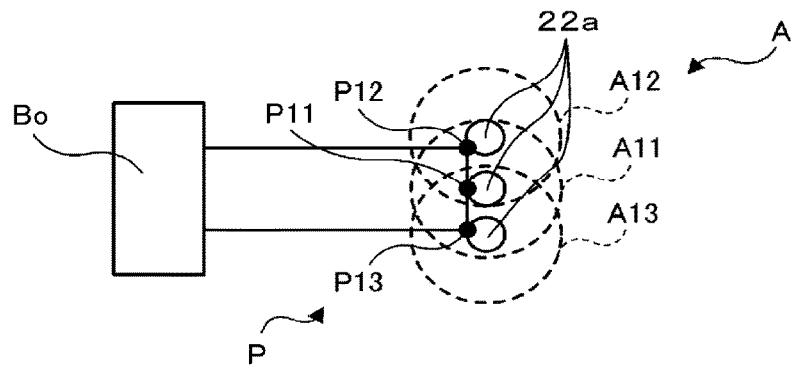
FIG. 11 A diagram illustrating pickup position P and interference determination area A of bolt Bo in a modified example.
Figure 12:
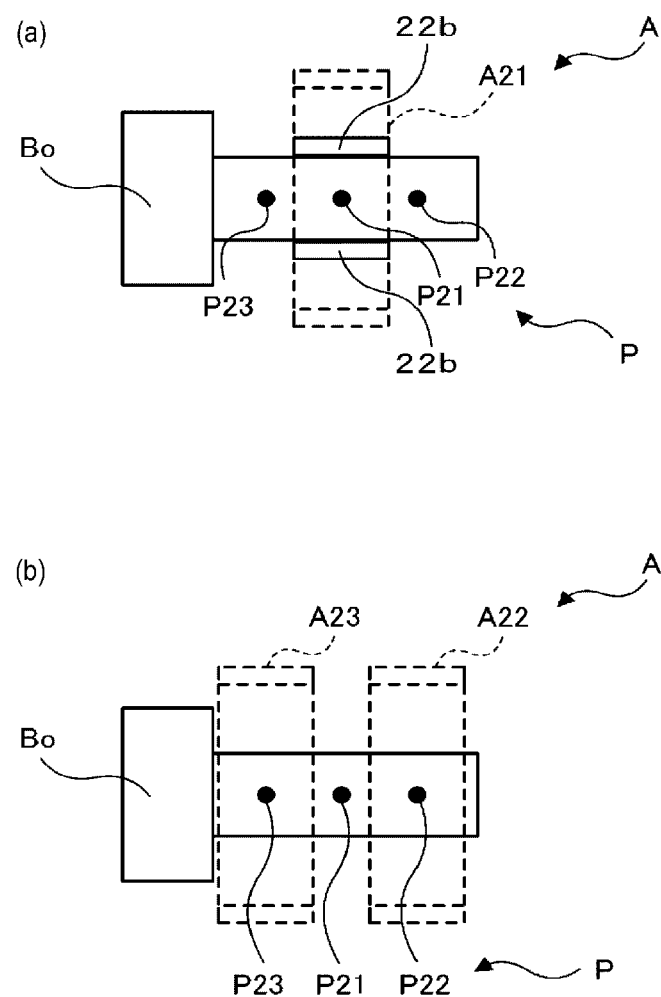
FIG. 12 A diagram illustrating pickup position P and interference determination area A of bolt Bo in another modified example.

In the embodiment described above, washer Wa is described as constituting a workpiece; however, the configuration is not limited to this. For example, the present disclosure may be applied to a work machine configured to pick up workpieces such as bolts Bo. Although transfer robot 20 is described as picking up workpieces with electromagnet 22a, the configuration is not limited to this, and hence, transfer robot 20 may pick up workpieces using a mechanical chuck or a suction nozzle. FIGS. 11, 12 are diagrams illustrating pickup positions P and interference determination areas A of bolts Bo according to modified examples.

FIG. 11 illustrates three pickup positions P11 to P13 and interference determination areas A11 to A13 for pickup positions P11 to P13 in a case where bolt Bo is picked up by electromagnet 22a. CPU 51 of control device 50 confirms interference of bolt Bo with another bolt Bo in individual interference determination areas A11 to A13 and need only pick up bolt Bo in, for example, pickup position P whose interference area S is determined to be the smallest by CPU 51. With a priority order of the pickup positions determined to be in the order of pickup positions P11, P12, P13, since CPU 51 selects pickup position P11 lying at a center position of an end face of a bolt shank in preference to the other pickup positions, transfer robot 20 can pick up bolt Bo properly. Transfer robot 20 may include, on end effector 22, a gripping mechanism configured to center bolt Bo attracted by electromagnet 22a by gripping a shank section (a threaded section) of bolt Bo from both sides thereof. In such a case, even when bolt Bo is picked up at any one of pickup positions P11, P12, P13, bolt Bo can be re-gripped and centered by the gripping mechanism. Due to this, with this modified example, being from the embodiment, the offsetting process of the embodiment may be omitted, and even without the offsetting process, workpieces are mounted in a reference mounting position wherever the workpieces are picked up.

FIG. 12 illustrates three pickup positions P21 to P23 and interference determination areas A21 to A23 of individual pickup positions P21 to P23 in a case where bolt Bo is picked up by pair of chuck claws 22b of a mechanical chuck. For convenience of illustration, interference determination area A21 is illustrated in FIG. 12A, while interference determination areas A22, A23 are illustrated in FIG. 12B. In picking up bolt Bo, transfer robot 20 grips bolt Bo by shifting chuck claws 22b from an open state to a closed state, and therefore, interference determination areas A21 to A23 constitute areas set by taking the open state of chuck claws 22b into consideration. With a priority order of the pickup positions determined to be in the order of pickup positions P21, P22, P23, since CPU 51 selects pickup position P21 lying close to a center a bolt shank in preference to the other pickup positions, transfer robot 20 can pick up bolt Bo properly.

The work machine of this disclosure that has been described heretofore may be configured as follows.

In the work machine of this disclosure, the storage device may store the multiple pickup positions in association with a predetermined priority order, and when selecting one pickup position from the multiple pickup positions, the control device may select the pickup position sequentially following a descending order from higher priority to lower priority. As a result, since only one pickup position need be selected according to the priority order, the pickup position can be selected more efficiently.

In the work machine of this disclosure, in the case where one pickup position cannot be selected from the multiple pickup positions of the pickup target component, the control device may skip the picking up of the pickup target component. By doing so, a further reduction in pickup efficiency can be suppressed which would otherwise be caused by attempting to pick up a pickup target component that interferes with other components in all the multiple pickup positions thereof.

In the work machine of this disclosure, the control device may cause the pickup member to mount the pickup target component, picked up at the one pickup position, in a mounting position that is offset in accordance with the one pickup position. As a result, even in the case where a pickup target component is picked up at any one of the multiple pickup positions, the pickup target component so picked up can properly be mounted at the mounting position.

INDUSTRIAL APPLICABILITY

The present disclosure can be applied to an industry where workpieces are transferred.

REFERENCE SIGNS LIST 10 work transfer system, 11 Workbench, 14 Supply box, 16 Tray conveyance device, 20 Transfer robot, 21 Robot arm, 22 End effector, 22a Electromagnet, 22b Chuck claw, 23 Camera, 24 Drive motor, 25 Encoder, 50 Control device, 51 CPU, 52 Storage section, 60 Input device, A, A1 to A4, A11 to A13, A21 to A23 Interference determination area, B Installation box, Bo Bolt, P, P1 to P4, P11 to P13, P21 to P23 Pickup position, T tray, Wa, Wa1 to Wa5 Washer.

[FIG. 1]
X-AXIS; Y-AXIS; Z-AXIS; UP; DOWN; LEFT; RIGHT; FRONT; REAR

[FIG. 2]
50: CONTROL DEVICE; 52: STORAGE SECTION; 20: TRANSFER ROBOT;
24: DRIVE MOTOR; 25: ENCODER; 22a: ELECTROMAGNET; 23: CAMERA;
16: TRAY CONVEYANCE DEVICE; 60: INPUT DEVICE

[FIG. 3]
52: STORAGE SECTION; WORK TYPES; PICKUP POSITION INFORMATION; PRIORITY ORDER; OFFSET AMOUNTS; PICKUP POSITION COORDINATES

[FIG. 5]

WORK TRANSFER PROCESS; S100: READ OUT PICKUP POSITION INFORMATION FOR WORK TYPE; S110: SET INTERFERENCE DETERMINATION AREA A FOR EACH PICKUP POSITION P; S120: CAPTURE IMAGE; S130: RECOGNIZE WORKPIECES FROM IMAGE; S140: SET ONE WORKPIECE TO PICKUP TARGET; S150: PICKUP PROCESS; S160: SHOULD PICKING UP OF PICKUP TARGET BE SKIPPED?; S170: MOUNTING PROCESS; S180: HAVE ALL WORKPIECES BEEN TRANSFERRED?

[FIG. 7]

PICKUP PROCESS; S200: CALCULATE INTERFERENCE AREA S WITH ANOTHER WORKPIECE WITHIN EACH INTERFERENCE DETERMINATION AREAR A; S210: COMPARE EACH INTERFERENCE AREA S WITH THRESHOLD Sref; S220: S☐Sref IN THREE OR MORE AREAS?; S230: IS S=0 IN ALL AREAS?; S250: SELECT PICKUP POSITION P1; S270: SELECT INTERFERENCE DETERMINATION AREA Amax WHOSE INTERFERENCE AREA S IS GREATEST; S280: COMPARE INTERFERENCE AREA Sdis OF INTERFERENCE DETERMINATION AREA Adis LYING FARTHEST AWAY FROM INTERFERENCE DETERMINATION AREA Amax WITH THRESHOLD Sref; S295: SELECT PICKUP POSITION P OF INTERFERENCE DETERMINATION AREA Adis; S240: SKIP PICKING UP; S260: PICK UP WORKPIECE IN SELECTED PICKUP POSITION

[FIG. 9]

MOUNTING PROCESS; S300: IS WORKPIECE PICKED UP IN PICKUP POSITION P1?; S310: IS WORKPIECE PICKED UP IN PICKUP POSITION P2?; S320: IS WORKPIECE PICKED UP IN PICKUP POSITION P3?; S330: SET MOUNTING POSITION BY OFFSETTING MOUNTING REFERENCE POSITION BY ΔP1; S340: SET MOUNTING POSITION BY OFFSETTING MOUNTING REFERENCE POSITION BY ΔP2; S350: SET MOUNTING POSITION BY OFFSETTING MOUNTING REFERENCE POSITION BY ΔP3; S360: SET MOUNTING POSITION BY OFFSETTING MOUNTING REFERENCE POSITION BY ΔP4; S370: MOUNT WORKPIECE IN SET MOUNTING POSITION

The invention claimed is:

1. A work machine, comprising:
a pickup member configured to pick up a pickup target component;
a storage device configured to store positional information on multiple pickup positions where the pickup member can pick up the pickup target component;
a recognition device configured to optically recognize multiple components including the pickup target component; and
a control device configured to
acquire the positional information on the multiple pickup positions of the pickup target component,
set interference determinations areas for each of the multiple pickup positions,
capture an image of the multiple components using the recognition device,
calculate an interference area where the pickup target component interferes with the multiple components for each of the interference determination areas of the multiple pickup positions using the image,
compare each interference area with a predetermined threshold,
select, from the multiple pickup positions of the pickup target component, one pickup position which is less likely to interfere with other components based on the comparing of each interference area with the predetermined threshold, and
cause the pickup member to pick up the pickup target component at the one selected pickup position.

2. The work machine according to claim 1,
wherein the storage device stores the multiple pickup positions in association with a predetermined priority order, and when selecting the one pickup position from the multiple pickup positions, the control device is configured to select the one pickup position sequentially following a descending order from higher priority to lower priority.

3. The work machine according to claim 1,
wherein the control device is configured to skip picking up of the pickup target component when the control device cannot select the one pickup position from the multiple pickup positions of the pickup target component.

4. The work machine according to claim 1,
wherein the control device is configured to cause the pickup member to mount the pickup target component, picked up at the one pickup position, in a mounting position that is offset in accordance with the one pickup position.

5. A pickup position selection method comprising:
acquiring positional information on multiple pickup positions where a pickup member can pick up a pickup target component from multiple components;
setting interference determinations areas for each of the multiple pickup positions;
capturing an image of the multiple components including the pickup target component;
calculating an interference area where the pickup target component interferes with the multiple components for each of the interference determination areas of the multiple pickup positions using the image,
comparing each interference area with a predetermined threshold; and
selecting one pickup position from the multiple pickup positions of a pickup target component to be picked up based on the comparing of each interference area with the predetermined threshold, the one selected pickup position being a position where the pickup target component to be picked up is less likely to interfere with another component of the multiple components.

6. The work machine according to claim 1,
wherein the recognition device is attached to a tip link of a robot arm on which the pickup member is provided, and the recognition device is configured to optically recognize positions and conditions of the multiple components disposed in the storage device.

* * * * *